United States Patent
Mueller et al.

(10) Patent No.: US 10,775,223 B2
(45) Date of Patent: Sep. 15, 2020

(54) METHOD FOR DETERMINING DEVIATIONS IN QUANTITY IN THE CASE OF A FLUIDIC METERING SYSTEM

(71) Applicant: Robert Bosch GmbH, Stuttgart (DE)

(72) Inventors: Johannes Georg Mueller, Ludwigsburg (DE); Sebastian Gepperth, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 15/938,389

(22) Filed: Mar. 28, 2018

(65) Prior Publication Data
US 2018/0283929 A1 Oct. 4, 2018

(30) Foreign Application Priority Data

Mar. 29, 2017 (DE) ........................ 10 2017 205 298

(51) Int. Cl.
*G01F 25/00* (2006.01)
*F01N 3/20* (2006.01)
*F01N 11/00* (2006.01)

(52) U.S. Cl.
CPC ....... *G01F 25/0092* (2013.01); *F01N 3/2066* (2013.01); *F01N 11/00* (2013.01); *F01N 2550/05* (2013.01); *F01N 2610/02* (2013.01); *F01N 2610/148* (2013.01); *F01N 2610/1433* (2013.01); *F01N 2900/1808* (2013.01)

(58) Field of Classification Search
CPC ... F01N 11/00; F01N 3/10; F01N 3/20; F01N 3/2066; F01N 3/0253; G01N 3/208
See application file for complete search history.

(56) References Cited

U.S. PATENT DOCUMENTS

| 5,353,591 A * | 10/1994 | Kabasin | F01N 3/2033 60/274 |
| 5,666,925 A * | 9/1997 | Denz | F02M 25/0809 123/198 D |
| 6,209,315 B1 * | 4/2001 | Weigl | B01D 53/9431 60/274 |
| 7,665,295 B2 * | 2/2010 | Pfaeffle | F01N 3/0253 60/274 |

(Continued)

FOREIGN PATENT DOCUMENTS

| DE | 102013207867 | 10/2014 |
| DE | 102013218897 | 3/2015 |

*Primary Examiner* — Helen C Kwok
(74) *Attorney, Agent, or Firm* — Michael Best & Friedrich LLP

(57) ABSTRACT

A method for identifying deviations in quantity in the case of a fluidic metering system (100-165), in particular an internal combustion engine of a motor vehicle, in which at least one conveying pump (125) for conveying a fluid, and at least one pressure sensor (135) for determining a fluidic pressure in the metering system (100-165), are disposed, wherein it is provided in particular that a test admeasurement of fluid is carried out (205), that a temporal pressure drop in the metering system (100-165) is detected (210), that the detected temporal pressure drop is compared with a pressure drop (215) that is to be theoretically expected (220), and that a deviation in quantity of the metering system (100-165) is determined based on the result of the comparison (225).

6 Claims, 2 Drawing Sheets

(56) References Cited

U.S. PATENT DOCUMENTS

| | | | | |
|---|---|---|---|---|
| 7,930,116 | B2* | 4/2011 | Huebner | F01N 11/00 60/286 |
| 9,062,807 | B2* | 6/2015 | Offenhuber | F01N 3/208 |
| 2005/0103312 | A1* | 5/2005 | Uchiyama | F02D 41/221 123/457 |
| 2005/0145233 | A1* | 7/2005 | Schneider | F02D 41/1454 123/690 |
| 2008/0264041 | A1* | 10/2008 | Gerlach | B01D 53/90 60/286 |
| 2008/0288159 | A1* | 11/2008 | Eser | F01L 1/34 701/104 |
| 2012/0037119 | A1* | 2/2012 | Adler | F02D 41/08 123/339.15 |
| 2013/0251546 | A1* | 9/2013 | Kellner | F01N 11/00 417/53 |
| 2013/0276429 | A1* | 10/2013 | Barcin | F01N 3/18 60/274 |
| 2014/0251272 | A1* | 9/2014 | Moonjelly | F02M 65/00 123/435 |
| 2015/0020777 | A1* | 1/2015 | Carey | F02D 41/22 123/445 |
| 2016/0178471 | A1* | 6/2016 | Blumrich | F02C 7/236 73/49.7 |

* cited by examiner (SdT)

METHOD FOR DETERMINING DEVIATIONS IN QUANTITY IN THE CASE OF A FLUIDIC METERING SYSTEM

BACKGROUND OF THE INVENTION

The invention relates to a method for identifying deviations in quantity in the case of a fluidic or hydraulic, respectively, metering system, in particular of an internal combustion engine of a motor vehicle, in which at least one conveying pump for conveying a fluid, and at least one pressure sensor for determining a pressure in the metering system, are disposed. The invention furthermore relates to a computer program, to a machine-readable data carrier for storing the computer program, and to an electronic control apparatus by means of which the method according to the invention is capable of being carried out.

In order for the pollutant emissions of motor vehicles to be restricted, the permissible limit values are being increasingly lowered worldwide. Presently, amended emission legislation (for example Euro 6) and new test cycles (WLTP: Worldwide Harmonized Light Duty Test Procedure or RDE: Real Driving Emission, expected as from 2017) will further reduce said permissible values. Adhering to these limit values in all vehicle classes will only be possible by way of an active exhaust gas post-treatment.

The Denoxtronic (DNOX) of an SCR (Selective Catalytic Reduction) metering system serves for injecting so-called "AdBlue", a urea/water solution (UWS) of 32.5% urea in water, into the exhaust gas flow ahead of an SCR catalytic converter. The urea is converted to ammonia by thermal decomposition and hydrolysis. The nitrogen oxides in the SCR catalytic converter are reduced to water and nitrogen by the ammonia.

In modern diesel engines having an SCR system, NOx raw emissions are substantially reduced by means of a so-called DNOX urea metering system. Future DNOX systems comprise a volumetric conveying pump or conveying module, respectively, and a pressure sensor. The systems are operated in a purely controlled manner and have a return flow to the tank mentioned for any non-consumed AdBlue solution. The conveying pump in most instances represents a displacement pump having an analogue construction principle or an analogue operating mode, respectively. The (conveying pump) mass flow can thus be determined in a relatively simple manner if the displacement volume is known.

A method for monitoring the quantity of a metering system concerned here is derived from DE 10 2013 218 897 A1, in which deviations of the conveying output of a conveying pump mentioned, and any potential leakage of the line system, are identified. The accuracy of the monitoring of the quantity here is substantially determined by the variable mechanical or fluidic, respectively, rigidity of the line system. The rigidity also depends on the ageing and the production tolerances of the system components used, the influence thereof on the rigidity not being known or foreseeable, respectively, or being able to be determined only by way of a relatively high effort.

A method for diagnosing a metering valve is also derived from DE 10 2013 207 867 B4, in which a pressure drop in a reagent that arises during a diagnosis metering is evaluated by way of a comparison with a threshold value. An error in the metering valve is identified when the threshold value is exceeded. The pressure loss to be expected is determined in an experimental manner.

SUMMARY OF THE INVENTION

The invention is based on the concept that in the case of a fluidic or hydraulic, respectively, metering system concerned here, equipped with a conveying pump, with a pressure sensor, and with a return flow for the respective fluid into a storage tank, deviations in the quantity in the metering of a fluid are not identified with the required precision by way of methods applied to date, in particular by virtue of an internal leakage of the conveying pump.

The mentioned metering systems which are known per se have only a very limited potential for determining or identifying, respectively, such deviations in quantity. This requires a very precise manufacturing of individual system components and/or complex computations of further variables, for example of the mechanical system rigidity. It is additionally disadvantageous in the case of these computations that the results of the system rigidity are substantially influenced by the internal leakage of the conveying pump. Moreover, the internal leakage varies over the service life of the pump.

In the case of the method proposed for determining or identifying such deviations in quantity in the case of a metering system concerned here, it is provided in particular that a test admeasurement or a test injection of fluid is carried out, and that the pressure drop in the metering system is detected depending on time. The pressure drop thus detected or measured, respectively, is compared with the pressure drop that is to be theoretically expected. The pressure drop that is to be theoretically expected is computed in particular by means of an analytical approximate solution which corresponds to a pressure drop that results in the case of a test admeasurement mentioned. As an approximate solution a mathematical series expansion of the temporal pressure profile depending on the measuring duration of the test admeasurement, or on the opening duration of a respective injector, is preferably used as a basis. The series expansion by inputting a relatively short measuring duration is approximated in a linear manner by deleting series members as from the second order. The deviation in quantity can be determined by means of the result of the comparison.

In the case of the method proposed it can furthermore be provided that as an analytical approximate solution the following equation is used as an basis, the latter analytically describing the fluidic pressure drop in the metering system after a test admeasurement performed at the temporal point $t=0$ with the duration $\Delta t$:

$$\sqrt{p(\Delta t)} \approx \sqrt{p_1} - (A_V^* \Delta t)/(\sqrt{2}\rho^* k) + (A_V^* A_D^* \Delta t^2)/(4\rho^* \sqrt{p_1}^* k^2) + \ldots,$$

wherein $p_1$ is the initial pressure prior to the test admeasurement, $A_V$ is the cross-sectional area of an injector that carries out the test admeasurement, $A_D$ is the cross-sectional area of a return flow throttle and pump leakage area, k is the compressibility of the metering system, and p is the density of the fluid.

As a result of the comparison a conclusion can also be drawn as to which system parameters have the strongest influence on the result of the test injection. The system parameters that result from the comparison can be applied in the development of a metering system concerned here, having reduced production tolerances of the pump and/or of the return flow. A substantial overall cost reduction moreover results on account thereof.

The effects of production tolerances of a conveying pump concerned here, having an internal leakage and an external return flow, in particular of a displacement pump such as, for example, a so-called "COR" pump, on the operation of the pump can advantageously be minimized by means of the proposed method. As a result, the production costs of a conveying pump can thus also be substantially reduced.

The invention can be applied in all fluidic or hydraulic metering systems, in particular in the case of SCR exhaust gas post-treatment systems mentioned. A preferred field of application are future "Denoxtronic" metering systems of the applicant, which are used both in passenger motor vehicles as well as in commercial motor vehicles.

The computer program according to the invention is specified for carrying out each step of the method, in particular when said computer program according to the invention runs on a computer or a control apparatus. Said computer program according to the invention enables the implementation of the method according to the invention on an electronic control apparatus without having to perform any constructive modifications thereon. To this end, the machine-readable data carrier on which the computer program according to the invention is stored, is provided. The electronic control apparatus according to the invention is obtained by uploading the computer program according to the invention to an electronic control apparatus, said electronic control apparatus according to the invention being specified for controlling a fluidic metering system concerned here by means of the method according to the invention.

Further advantages and design embodiments of the invention are derived from the description and the appended drawings.

It is understood that the features mentioned above and yet to be mentioned hereunder can be applied not only in the respective combination stated, but also in other combinations or individually, without departing from the scope of the present invention.

DETAILED DESCRIPTION

The extended identification of deviations in quantity described hereunder for DNOX systems is capable of being applied in particular in the case of displacement pumps having an internal leakage and an external return flow, for example in the case of mentioned "COR" pumps.

Figure 1:
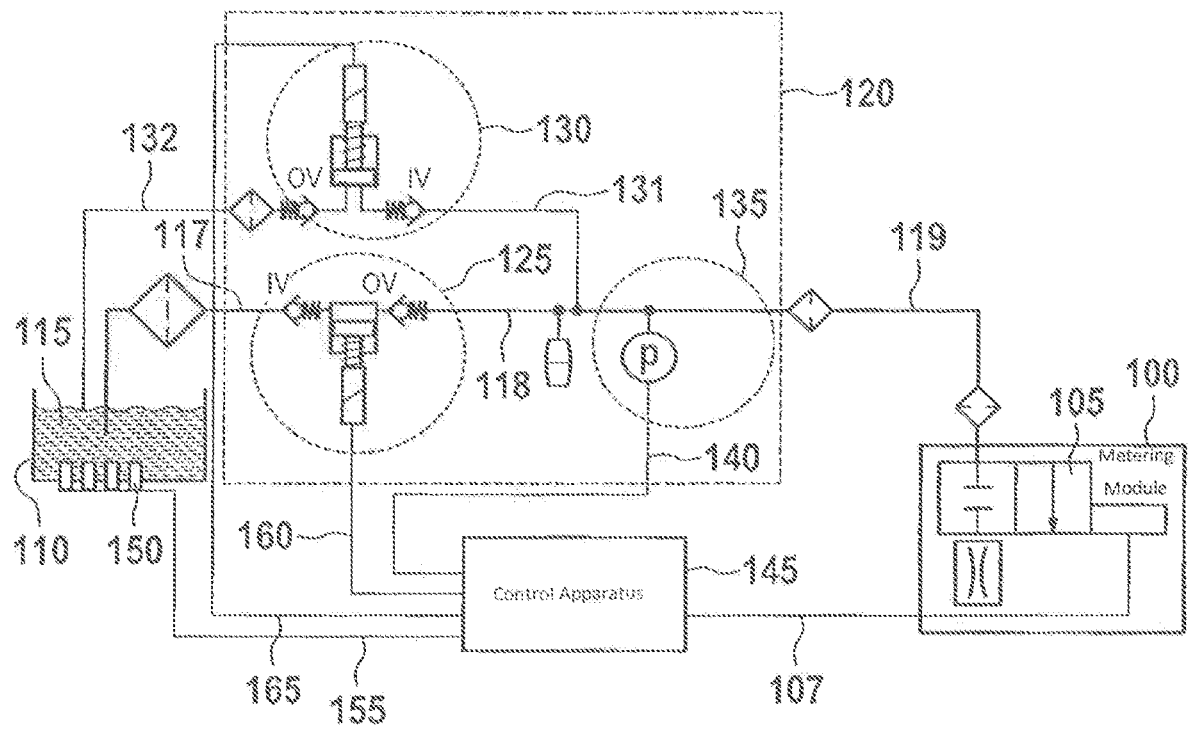
FIG. 1 shows a block diagram of a UWS metering system of an SCR catalytic converter system according to the prior art.

As is schematically illustrated in FIG. 1 by way of an example of an SCR catalytic converter system, metering systems equipped with conveying units and injectors are used in the exhaust gas post-treatment of internal combustion engines by means of metering "AdBlue" or UWS, respectively, into the exhaust gas flow. In many cases herein, a return flow into the AdBlue tank is also provided. In order for an operation of these systems that conforms to the exhaust gas legislation to be guaranteed, the quantity of AdBlue that is metered into the exhaust gas train has to be monitored.

The fluidic metering system known per se of a motor vehicle, shown in FIG. 1, comprises a metering module 100 having an metering valve 105 that is presently controllable in a cycled manner. The UWS Floyd 115 that is stored in a tank 110 is supplied by means of a pump module 120, specifically by way of the discharge line 117, a mainline 118, and a supply line 119, to the metering module 100. The pump module 120 comprises a conveying pump 125 and a return conveying pump 130 which with a pressure sensor 135 arranged in the region of the mainline 118. The pressure sensor 135 by way of a signal or control line 140, respectively, is connected to a control apparatus 145. The return conveying pump 130 is connected to a return conveying line 131 that emanates from the main line 118, wherein excess fluid that is to be returned into the tank 110 is routed by way of a return flow line 132 that is connected to the tank 110, or opens into the tank 110, respectively.

The conveying pump 125 which in the present exemplary embodiment is configured as a diaphragm pump, suctions the UWS fluid 115 from the tank 110 and compresses said UWS fluid to a system pressure of 4.5 to 8.5 bar that is required for the atomization. The metering module 100 admeasures the UWS quantity that is required for the NOx reduction and atomizes said UWS quantity into the exhaust gas flow (not shown), specifically ahead of the SCR catalytic converter. The controlling of the metering and heating strategy, and of an on-board diagnosis, is performed by a motor control apparatus (not shown) or by the control apparatus 145 shown in FIG. 1. By processing the current motor operating data and all required sensor data, the quantity of the reduction agent by means of the closed-loop control is tuned in a manner known per se precisely to the operating point of the internal combustion machine and to the catalytic converter specific properties, in order for nitrogen oxide to be converted to the maximum.

It is to be noted that the mentioned metering valve 105 operating as a dosing means is actuated in a manner known per se by the control apparatus 145 by way of a control line 107.

A sensor system 150 which by way of the signal or control line 155, respectively, is connected to the control apparatus 145 is disposed in the tank 110. The sensor system 150 in particular serves for reporting a low level of the fluid 115 that is optionally present to the control apparatus 145, in order for the vehicle driver to be able to optionally top up the fluid. The conveying pump 125 and the return conveying pump 130 are also connected to the control apparatus 145 by way of two further signal or control lines 160, 165, respectively, so as to actuate in a manner known per se the two pumps 125, 130 for the metering operation.

In order for future metering systems to be homologated, deviations in quantity of 35% must be identified by means of a so-called "Consumption Deviation Monitoring" (CDM). Systems known per se have the potential of identifying these deviations in quantity only to a limited extent, and require the highly precise manufacturing of individual system components and/or the complicated computation of further variables (rigidity determination). In concrete terms, by way of the rigidity determination that is presently applied in a system having a displacement pump, the trade-off is a reliance of the result on the internal leakage of the pump. The reduction and delimitation of the internal leakage is not possible based on the current state of knowledge, since said leakage can vary intensely over the service life.

It can be determined which system parameters have a major influence on the result of the test injection by means of the analytical approximate solution described hereunder of the pressure drop over the time of a test injection of fluid. A simple function that is universally applicable and has a higher accuracy can be used by way of the systematic combination of the analytical solution having existing and future fluidic or hydraulic components. This enables the reduction in production tolerances of the pump and of the return flow, and thus enables a reduction in costs.

The following equation (1) describes in an analytical manner the fluidic or hydraulic pressure drop, respectively, for example in a UWS metering system after a metering test injection performed at t=0:

$$\sqrt{p(\Delta t)} \approx \sqrt{p_1} - (A_V * \Delta t)/(\sqrt{2}\rho * k) + (A_V * A_D * \Delta t^2)/(4\rho * \sqrt{p_1} * k^2) + \ldots \quad (1).$$

According to the equation (1), the metering procedure results approximately in a series expansion in the opening/measuring duration $\Delta t$, specifically depending on the parameters initial pressure ahead of the opening: $p_1$
cross-sectional area of the injector (valve): $A_V$
cross-sectional area of the return throttle and the pump leakage area: $A_D$
system compressibility: k
and AdBlue density: p.

Figure 2:
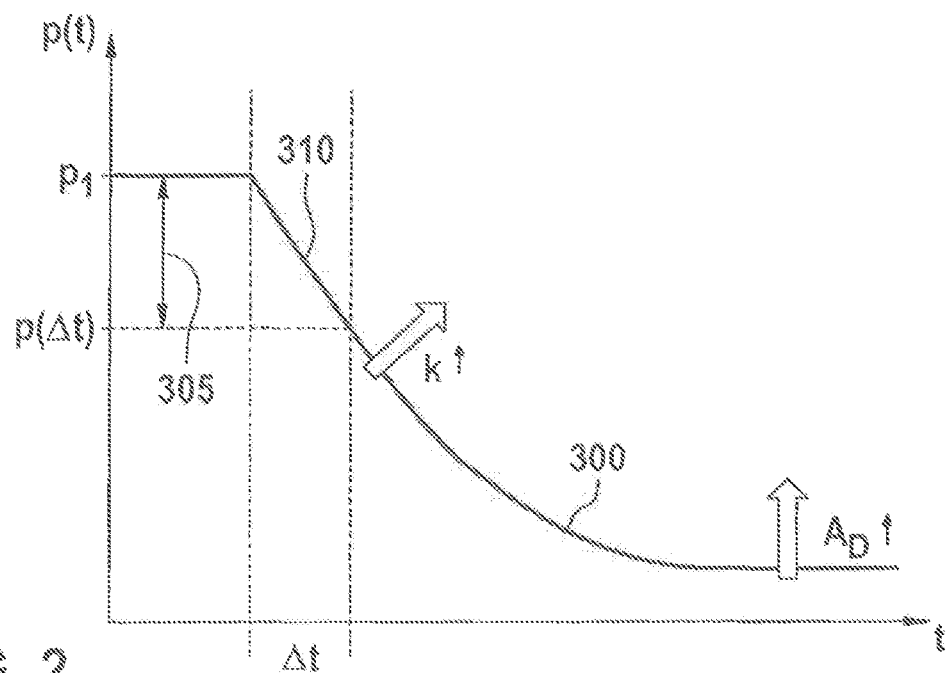
FIG. 2 shows a typical pressure profile in the metering of a fluid concerned here.

The qualitative correlation between the individual parameters in the equation (1) is illustrated in FIG. 2 by means of a typical pressure profile 300 in the metering of UWS solution by means of an injector. In a relatively short temporal window $\Delta t$ of, for example. 0.2 s, at a pressure drop $p_1 - p(\Delta t)$ 305, proceeding from an initial value $p_1$, an approximately linear pressure profile 310 results. In the case of an assumed increase in the system compressibility k, the curve 300 would be displaced to the top right (in the direction indicated by the upper arrow). In the case of an assumed enlargement of the cross-sectional area of the return throttle $A_D$, the pressure curve 300 in the run-out region on the right would be displaced to the top (in the direction indicated by the lower arrow).

In the determination of the deviation in quantity, the measured pressure drop is now compared with the pressure drop that is to be theoretically expected. In the metering systems known per se (DNOX2.2, DNOX6.x) the exact value of the system compressibility k has to be determined in order for the equation (1) to be able to be solved in the first place. However, this value is obtained only depending on the parameter $A_D$. Therefore, a benefit in terms of accuracy would only be achieved in the case of a metering system in which $A_D$ is known to a sufficiently precise extent. However, in a metering system having a displacement pump, the variable $A_D$ also comprises the internal leakage of said pump. If the rigidity determination is dispensed with, and if the pressure drop to be expected is determined by way of a reference measurement, the variable $A_D$ appears only in the second order of the measuring duration.

The present approach is based on the concept of being able to neglect the influence of the second series member or term, respectively, (return flow and pump leakage) in the equation (1) by way of a sufficiently short metering or measuring time. A further advantage of a relatively short metering time moreover lies in that inadvertent introduction of AdBlue into the exhaust gas train can be effectively prevented or at least reduced during the test injection.

As an alternative to the shortening of the measuring time, in the case of the present approach for eliminating the second series member it can also be provided that the compressibility k of the system is increased, for example by means of the use of a pressure damper, of an air cushion, or by means of flexible lines.

Figure 3:
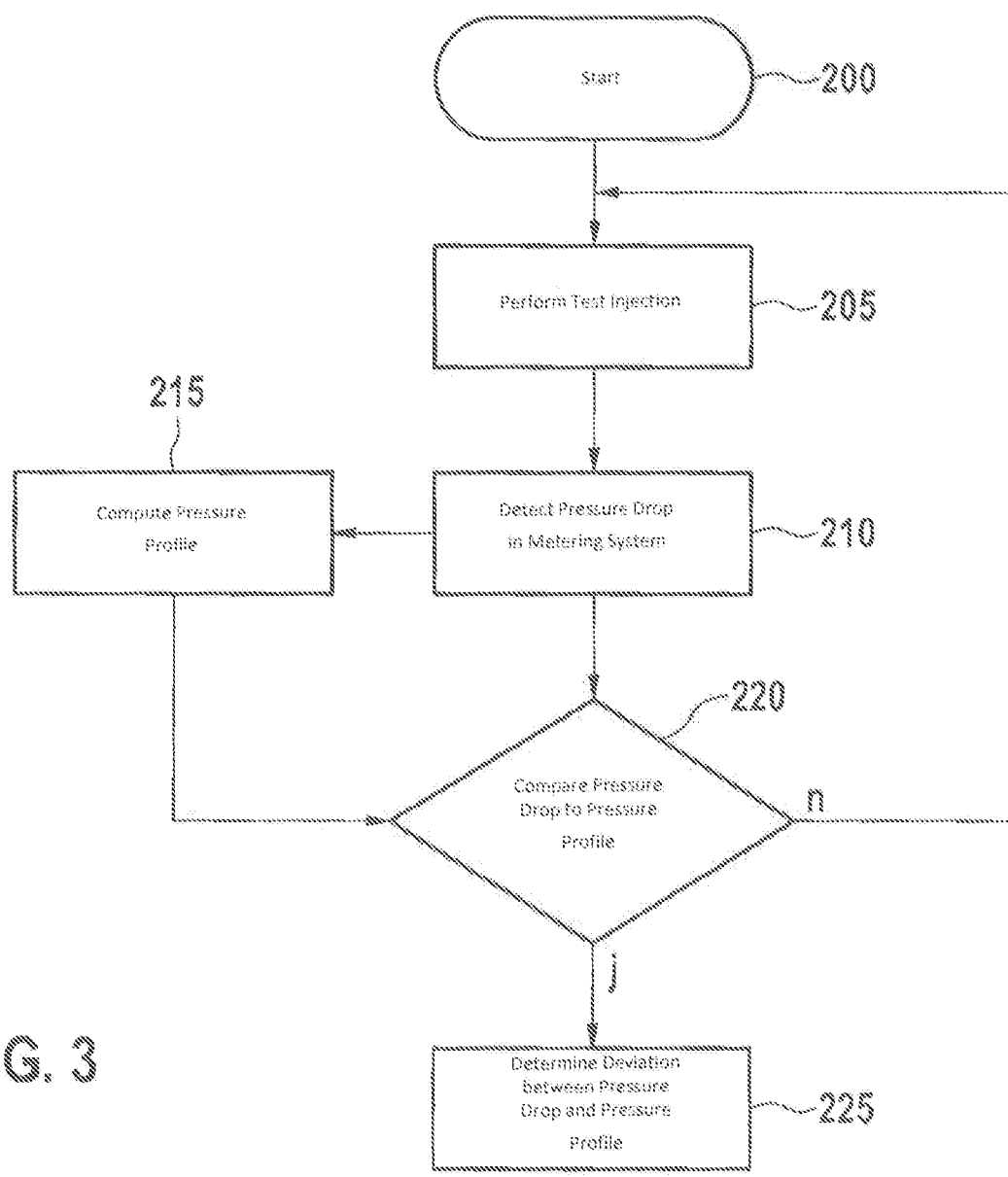
FIG. 3 shows an exemplary embodiment of the method according to the invention by means of a flow diagram.

An exemplary embodiment of the method according to the invention is shown in FIG. 3. After the start 200 of the routine shown, a test injection is first carried out 205, and the pressure drop arising thereafter in the metering system is detected or measured, respectively, 210. On the basis of the starting or initial pressure $p_1$, respectively, measured in the metering system shortly before the test injection, the pressure profile that is to be theoretically expected is computed, for example, by means of the equation (1). The pressure profile detected according to step 210 and the pressure profile computed according to step 215 are compared with one another in step 220, and in the case of a deviation in quantity being established, a value for the deviation in quantity is subsequently determined 225 by means of the resulting differences. If no deviation in quantity is established in the test step 220, the routine reverts back to the start, for example ahead of step 205, in order for the routine to be carried out once again. Alternatively, the routine can also first be terminated and subsequently be optionally restarted 200.

An exemplary computation as to how an absolute value for the deviation in quantity can be determined from the differences mentioned, or as to how a comparison of the measured data can be performed by way of the analytical equation (1), respectively, is set forth hereunder. It is first determined by way of the curvature of the curve of the pressure profile herein whether a linear approximation according to the equation (1) is possible with the required accuracy. To this end, the quotient from the discreet second deviation of the square root of the pressure profile and from the gradient of the square root of the pressure profile is compared with a threshold value. If said threshold value is exceeded, a smaller temporal step has to be used for the temporal discretization of the pressure profile. As soon as a temporal step by way of which the threshold value is not exceeded is achieved, the linear approximation of the equation (1) is permissible and in the revised form is:

$$(\sqrt{p(\Delta t)} - \sqrt{p_1})/\Delta t \approx -A_V/(\sqrt{2}\rho * k).$$

The measured gradient of the square root of the pressure profile is accordingly proportional to the cross-section of the metering valve, said cross-section being a measure of the metered quantity. An insufficient metering can thus be identified when the gradient deviates excessively from a previously measured reference gradient.

$$g_{rev} = (\sqrt{p_{rev}(\Delta t)} - \sqrt{p_{rev,1}})/\Delta t_{rev}$$

The quotient from the measured gradient and from the reference gradient according to the equation above is equivalent to the following combined variable:

$$A_V/A_{Vrev} * (\sqrt{2\rho_{rev}} * k_{rev})/(\sqrt{2}\rho * k).$$

Assuming that p and k have not changed since a mentioned reference measurement, the result is reduced to the ratio $A_V/A_{vrev}$ which represents the deviation in quantity.

The method described can be implemented in the form of a control program for an electronic control apparatus for controlling an internal combustion engine, or in the form of one or a plurality of corresponding electronic control units (ECUs).

The invention claimed is:

1. A method for identifying deviations in quantity of a fluid in a fluidic metering system, the method comprising:
providing at least one conveying pump for conveying a fluid,
providing at least one pressure sensor for determining a fluidic pressure in the fluidic metering system, carrying out a test admeasurement of the fluid including, detecting a temporal pressure drop in the metering system, comparing the detected temporal pressure drop to a pressure drop that is to be theoretically expected (220), and determining a deviation in quantity of the metering system based on the result of the comparison (225), wherein as the result of the comparison, an additional conclusion is drawn as to which system parameters of the metering system have the strongest influence on the result of the test admeasurement.

2. The method according to claim 1, wherein the pressure drop that is to be theoretically expected is computed using an analytical approximate solution which corresponds to a pressure drop that theoretically results in the case of a test admeasurement.

3. The method according to claim 1, wherein in an analytical approximate solution, the following equation is used as a basis, the equation describing a fluidic pressure drop in the metering system (100-165) after the test admeasurement (205) performed at t=0 with the duration $\Delta t$:

$$\sqrt{p(\Delta t)} \approx \sqrt{p_1} - (A_V * \Delta t)/(\sqrt{2}\rho * k) + (A_V * A_D * \Delta t^2)/(4\rho * \sqrt{p_1} * k^2) + \ldots,$$

wherein $p_1$ is an initial pressure prior to the test admeasurement (205), $A_V$ is a cross-sectional area of an injector that carries out the test admeasurement (205), $A_D$ is a cross-sectional area of a return flow throttle and pump leakage area, k is a compressibility of the metering system (100-165), and $\rho$ is a density of the fluid.

4. A non-transitory, computer-readable storage medium storing instructions for carrying out each step of the method according to claim 1.

5. An electronic control apparatus which is specified for controlling a fluidic metering system in which at least one conveying pump for conveying a fluid, and at least one pressure sensor for determining a fluidic pressure in the metering system, are disposed, by means of a method according to claim 1.

6. The method according to claim 1, wherein the system parameters include at least one of an initial pressure prior to the test admeasurement, a cross-sectional area of an injector that carries out the test admeasurement, a cross-sectional area of a return flow throttle and pump leakage area, a compressibility of the metering system (100-165), and a density of the fluid.

* * * * *